(12) United States Patent
Kezuka et al.

(10) Patent No.: US 6,699,622 B2
(45) Date of Patent: Mar. 2, 2004

(54) SOLID OR GEL ELECTROLYTE AND BATTERY USING THE SAME

(75) Inventors: Koichiro Kezuka, Miyagi (JP); Takahiro Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 09/862,621

(22) Filed: May 22, 2001

(65) Prior Publication Data

US 2002/0031710 A1 Mar. 14, 2002

(30) Foreign Application Priority Data

May 24, 2000 (JP) .................................. P2000-152473

(51) Int. Cl.[7] .............................................. H01M 6/14
(52) U.S. Cl. ..................... 429/303; 429/300; 429/304; 429/306; 429/321; 429/322; 429/323
(58) Field of Search ................................ 429/300, 303, 429/304, 306, 321, 322, 323

(56) References Cited

U.S. PATENT DOCUMENTS

| 5,030,527 | A | * | 7/1991 | Carpio et al. ................ 429/310 |
| 5,223,353 | A | | 6/1993 | Ohsawa et al. |
| 5,433,876 | A | * | 7/1995 | Fauteux et al. ............ 252/62.2 |
| 5,453,335 | A | * | 9/1995 | Fauteux et al. ............ 429/308 |
| 5,660,178 | A | | 8/1997 | Kantner et al. |
| 5,985,486 | A | * | 11/1999 | Giron ........................ 429/188 |
| 6,208,452 | B1 | * | 3/2001 | Nishikitani et al. ......... 359/270 |
| 6,242,135 | B1 | * | 6/2001 | Mushiake .................... 429/304 |
| 6,288,187 | B1 | * | 9/2001 | Armand ....................... 526/240 |
| 6,366,795 | B1 | * | 4/2002 | Bremer et al. ............. 600/395 |

FOREIGN PATENT DOCUMENTS

| DE | 197 13 072 A | 10/1998 |
| EP | 0 809 314 A | 11/1997 |
| EP | 1 001 477 A | 5/2000 |

* cited by examiner

*Primary Examiner*—Bruce F. Bell
(74) *Attorney, Agent, or Firm*—Sonnenschein, Nath & Rosenthal LLP

(57) ABSTRACT

Disclosed is an electrolyte capable of obtaining an excellent quality of electrolyte, and a battery using the electrolyte. A battery device in which a positive electrode and a negative electrode are stacked with a separator being interposed therebetween is enclosed inside an exterior member. The separator is impregnated with an electrolyte. The electrolyte contains a high polymer, a plasticizer, a lithium and at least either carboxylic acid or carboxylate. Therefore, when preparing a high polymer by means of polymerization of monomers, the polymerization of monomers can be smoothly processed even if there is a factor for inhibiting reaction such as copper. As a result, the amount of non-reacted monomers remained in the electrolyte can be suppressed to be extremely small. Therefore, decomposition and reaction of monomers are suppressed even after repeating charging/discharging, so that the deterioration in the charging/discharging efficiency and the charging/discharging characteristic can be prevented.

18 Claims, 2 Drawing Sheets

SOLID OR GEL ELECTROLYTE AND BATTERY USING THE SAME

RELATED APPLICATION DATA

The present application claims priority to Japanese Application No. P2000-152473 filed May 24, 2000 which application is incorporated herein by reference to the extent permitted by law.

BACKGROUND OF THE INVENTION

1. Field of the Invention

The invention relates to an electrolyte containing an electrolyte salt and a battery using the electrolyte.

2. Description of the Related Art

Recently, in accordance with development in electronic technology, a number of small-size portable electron devices such as VTRs (video tape recorder) with a built-in camera, cellular phones and note-book computers have come into wide use, and miniaturization and lightening of the devices have become the subject. Batteries, specifically, secondary batteries have been put at the stage of development as a portable electric source used for the devices. Especially, lithium-ion secondary batteries have drawn the attention since the batteries can achieve a high energy density. Specifically, thin-type batteries with form features capable of being folded and having high versatility have been actively studied and developed.

In the batteries with form features having the high versatility, for example, a solid-state electrolyte with no chance of liquid leakage is used. As the solid-state electrolyte, for example, a gel electrolyte in which a plasticizer containing an electrolyte salt is held in a high polymer, and a high polymer solid electrolyte in which an electrolyte salt is dispersed onto a high polymer have drawn the attention. A number of reports have been made on the gel electrolyte or the high polymer solid electrolyte. For example, the electrolytes can be prepared using a simple method such as polymerization of solutions containing monomers to be in a gel- or solid-state.

For example, in a battery stacking a positive electrode and a negative electrode with a separator interposed, the electrolyte is prepared by impregnating the separator with a solution containing monomers and then the monomers are polymerized. Also, the electrolyte is prepared by applying a solution containing monomers on a positive electrode or a negative electrode and then monomers are polymerized.

However, in the battery of the related art, a negative electrode collector layer is made of copper (Cu), which becomes a factor for inhibiting the reaction, thereby interrupting a smooth process of monomer-polymerization. As a result, a number of non-reacted monomers remain in the electrolyte and the remained monomers dissolve or react in accordance with the electrode reaction, resulting in deterioration in the charging/discharging efficiency or the charging/discharging characteristic. Polymerization can be promoted by changing the condition such as increasing the reaction temperature. However, if the reaction temperature is increased, the electrolyte is decomposed. As a result, the charging/discharging efficiency or the charging/discharging characteristic is also deteriorated.

SUMMARY OF THE INVENTION

The invention has been designed to overcome the forgoing problems. The object of the invention is to provide an electrolyte capable of obtaining an excellent electrolyte and a battery using the electrolyte.

An electrolyte of the invention is prepared by polymerization reaction and contains at least one and more of carboxylic acid, alkali metal carboxylate, and alkaline-earth metal carboxylate.

A battery of the invention comprises a positive electrode, a negative electrode, and an electrolyte. The electrolyte is prepared by polymerization reaction and contains at least one and more of carboxylic acid, alkali metal carboxylate, and alkaline-earth metal carboxylate.

The electrolyte of the invention contains at least either carboxylic acid or carboxylate. Therefore, polymerization of monomers can be smoothly processed even under the existence of copper in the case where the electrolyte contains the high polymer obtained by, for example, polymerization of monomers. As a result, an excellent quality of electrolyte with little amount of remained monomers can be obtained.

The battery of the invention exhibits an excellent battery characteristic since the battery comprises the electrolyte of the invention.

Other and further objects, features and advantages of the invention will appear more fully from the following description.

DETAILED DESCRIPTION OF THE PREFERRED EMBODIMENTS

Figure 1:
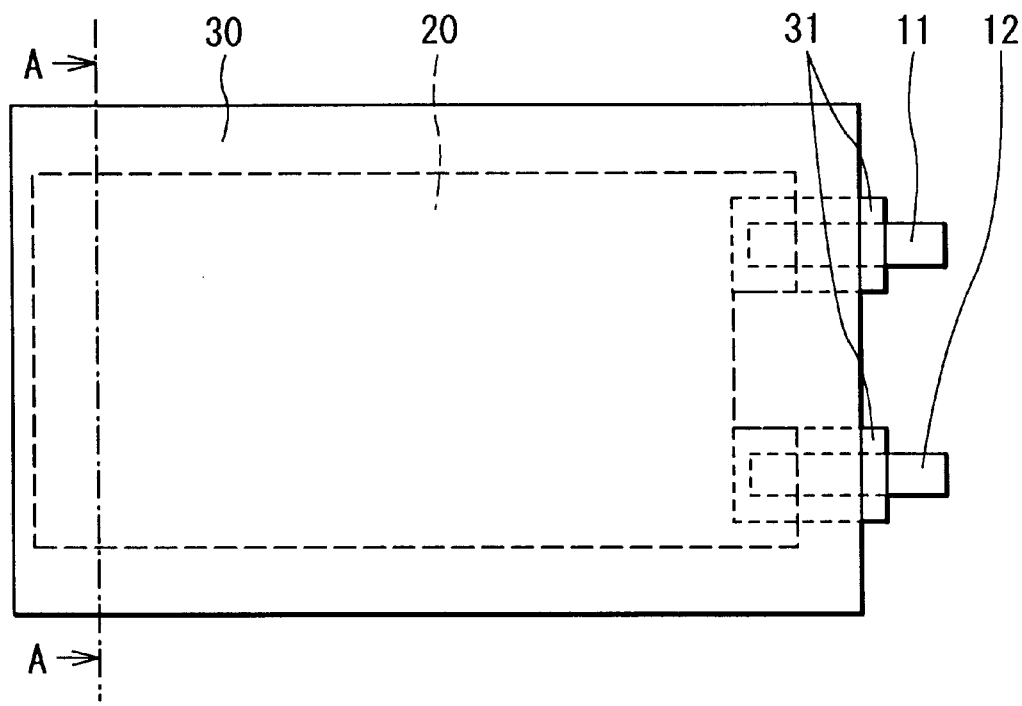
FIG. 1 is a plan view showing the configuration of a battery according to a first embodiment of the invention.

In the followings, embodiments of the invention will be described in detail by referring to the drawings.

First Embodiment

Figure 2:
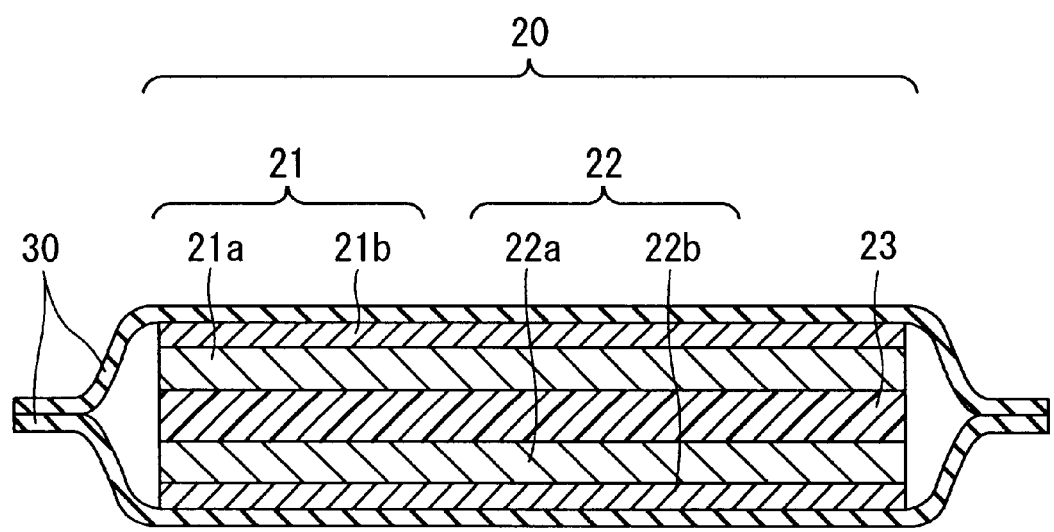
FIG. 2 is a cross section of the battery taken along the line A—A in FIG. 1.

FIG. 1 shows a plane structure of a battery according to a first embodiment of the invention. FIG. 2 is a cross-sectional structure taken along the line A—A in FIG. 1. The battery is obtained by enclosing a battery device 20, to which a positive electrode lead 11 and a negative electrode lead 12 are attached, inside an exterior member 30. The battery device 20 has a configuration in which a positive electrode 21 and a negative electrode 22 are stacked with a separator 23, with which the electrolyte is impregnated, being interposed therebetween.

The positive electrode 21 is formed of, for example, a positive electrode mixture layer 21a and a positive electrode collector layer 21b. The positive electrode mixture layer 21a is provided on one side of the positive electrode collector layer 21b. Although not shown in figure, the positive electrode mixture layer 21a may be provided on both sides of the positive electrode collector layer 21b. The positive electrode collector layer 21b contains, for example, alminum (Al), and specifically, it is made of, for example, aluminum foil.

The positive electrode mixture layer 21a is formed containing, for example, a positive electrode material, a conductive agent such as carbon black or graphite, and a binder such as polyvinylidene fluoride. Preferable examples of the positive electrode material are a lithium composite oxide or lithium composite sulfide containing lithium (Li), a metallic sulfide or oxide which does not contain lithium such as $TiS_2$, $MoS_2$, $NbSe_2$, or $V_2O_5$, and specific high polymer materials, and one or two kinds and more are selected from the above-mentioned group in accordance with the usage of the battery.

Specifically, lithium composite oxide expressed by $Li_xMaO_2$ is preferable since it can achieve a high energy density. In the compositional formula, Ma is preferable to be one and more kinds of transition metals. Specifically, it is preferable to be at least one kind selected from the group consisting of cobalt (Co), nickel (Ni), and manganese (Mn). The value of x normally lies within the range of $0.05 \leq x \leq 1.10$. Specific examples of the lithium composite oxide are $LiNi_yCo_{1-y}O_2$ (where $0 \leq y \leq 1$) or $LiMn_2O_4$ and the like. There is also lithium composite oxide which is expressed by $LiMbPO_4$. In the compositional formula, Mb represents at least one kind of element selected from the group consisting of cobalt, nickel, iron (Fe), manganese, copper (Cu), magnesium (Mg), zinc (Zn), calcium (Ca), cadmium (Cd), strontium (Sr), and barium (Ba). The lithium composite oxide has a so-called olivine structure.

The negative electrode 22 is, like the positive electrode 21, formed of, for example, a negative electrode mixture layer 22a and a negative electrode collector layer 22b. The negative electrode mixture layer 22a is provided on one side of the negative electrode collector layer 22b. Although not shown in figure, the negative electrode mixture layer 22a may be provided on both sides of the negative electrode collector layer 22a. The negative electrode collector layer 22b contains, for example, copper, and specifically, it is made of, for example, a copper foil. Copper is a substance with an excellent conductivity so that the negative electrode collector layer 22b containing copper is preferable since it functions as an excellent collector.

The negative electrode mixture layer 22a is formed containing, for example, a negative electrode material and a binder such as polyvinylidene fluoride. The negative electrode material contains, for example, a material capable of occluding and releasing lithium or a material capable of separating-out or dissolving lithium. Among these, it is preferable to contain the material capable of occluding and releasing lithium as the negative electrode material so that an excellent charging/discharging cycle characteristic can be obtained. It is also possible to use a combination of the material capable of occluding/releasing lithium and the material capable of separating-out/dissolving lithium.

Examples of the negative electrode material capable of occluding/releasing lithium are carbonaceous materials such as non-graphitizing carbon, graphitizing carbon, and graphite. The carbonaceous materials are preferable since, in addition to being capable of obtaining an excellent charging/discharging cycle characteristic, it is stable in the air and is easily produced for industrial use. Specific examples of the carbonaceous materials are cracked carbon, cokes, graphite, glassy carbon, high polymer organic compound calcined materials, carbon fiber, and activated carbon. The cokes include pitch coke, needle coke and petroleum coke. The high polymer calcined material is a material obtained by calcining a high polymer material such as phynolic resin or furan resin at an appropriate temperature so as to be carbonated.

Other examples of the negative electrode material capable of occluding and releasing lithium are a metal or a semiconductor capable of forming alloy or compound with lithium, and the alloy and compound of these. The metal, alloy, or compound of those are expressed by, for example, a chemical formula $D_sE_tLi_u$. In the chemical formula, D represents at least one kind of metallic element or semiconductor element capable of forming alloy or compound with lithium, and E represents at least one kind of metallic element or semiconductor element other than lithium and D. The values of s, t, and u are $s>0$, $t \geq 0$, and $u \geq 0$, respectively.

As the metal elements and the semiconductor elements capable of forming alloys and compounds with lithium, 4B-group metal elements and semiconductor elements are preferable. Silicon (Si) and stannum (Sn) are more preferable, and silicon is most preferable. The alloys and compounds of these are also preferable. Specific examples of these are $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

Still other examples of the negative electrode material capable of occluding and releasing lithium are metallic oxide and high polymer material. An example of the metallic oxide is tin oxide, and examples of high polymer materials are polyacetylene and polypyrrole.

Materials capable of separating-out/dissolving lithium are, for example, lithium metals and lithium alloys. Examples of lithium alloy are alloys of lithium combined with one or two, and more kinds of aluminum (Al), stannum (Sn), zinc (Zn), plumbum (Pb), silicon (Si), gallium (Ga), indium (In), cobalt (Co), titanium (Ti) and cadmium (Cd).

The separator 23 is formed of, for example, a porous film made of polyolefin-based material such as polypropylene or polyethylene, or a porous film made of an inorganic material such as ceramic nonwoven cloth. A structure in which two and more kinds of the porous films are stacked may also be used.

The electrolyte impregnating the separator 23 is so-called a gel electrolyte and contains, for example, a high polymer, a plasticizer, and lithium salt as an electrolyte salt.

The high polymer is for keeping the form of the electrolyte and for maintaining the mechanical strength, and may or may not have ionic conductivity. Examples of the high polymer used are the ones prepared by radical-polymerizing monomers such as ester high polymer, ether high polymer, and fluorine high polymer. Monomers include monofunctional monomers which have one polymerizing functional group in one molecule and polyfunctional monomers which have two and more polymerizing functional groups in one molecule. One of these alone, or two and more kinds are mixed to be used. Specifically, in the case of preparing, for example, ester high polymer, the monofunctional monomers such as methacrylate, acrylate, dimethacrylate, trimethacrylate, or diacrylate can be used.

The plasticizer, in addition to softening the electrolyte, has a function of dissolving lithium salt. Examples of the plasticizer are ester such as butyrate, acetate, propionate, ether such as diethyl ether, dimethyl ether or the like and ester carbonate such as propylene carbonate, ethylene carbonate, diethyl carbonate, and dimethyl carbonate. One of these alone, or two and more kinds are mixed to be used.

The concentration of the high polymer in the electrolyte is preferable to lie within the range of, for example, 3 percent by volume to 50 percent by volume, both inclusive. The concentration of the plasticizer in the electrolyte is preferable to lie within the range of 50 percent by volume to 97 percent by volume, both inclusive. The reason is that if the concentration of the plasticizer is too high and that of the high polymer is too low, the mechanical strength cannot be maintained while the ionic conductivity can be improved. On the contrary, if the concentration of the high polymer is too high, the ionic conductivity is lessened while the mechanical strength can be improved.

Appropriate examples of lithium salt are $LiPF_6$, $LiBF_4$, $LiAsF_6$, $LiClO_4$, $LiCF_3SO_3$, $LiN(SO_2CF_3)_2$, $LiC(SO_2CF_3)_3$, LiAlCl$_4$, and LiSiF$_6$, and two and more kinds of these may also be mixed to be used. Especially, LiPF$_6$ and LiBF$_4$ are preferable as the lithium salt since they are excellent in oxidation stability. The concentration of lithium salt in the plasticizer is preferable to lie within the range of 0.1 mol/dm$^3$ to 3.0 mol/dm$^3$, and more preferable to lie within the range of 0.5 mol/dm$^3$ to 2.0 mol/dm$^3$.

The electrolyte also contains at least either carboxylic acid or carboxylate. Therefore, reaction in the electrolyte is processed smoothly even if the high polymer is prepared by performing polymerization of monomers in a state where the positive electrode 21 and the negative electrode 22 are stacked and the electrolyte is interposed therebetween. In other words, reaction is to be smoothly processed even if the negative electrode 22 contains a factor for inhibiting reaction such as copper.

Specific examples of carboxylic acid are: alkylmonocarboxylate such as formic acid, acetic acid, octanic acid, and stearic acid; alkyldicarboxylate such as oxalic acid, malonic acid, and adipic acid; aromatic carboxylic acid such as benzoic acid and terephthalic acid; and the alkyl carboxylate fluoride such as perfluoro n-caprylate. Examples of carboxylate are alkali metal carboxylate and alkaline-earth metal carboxylate. Examples of alkali metal carboxylate are lithium salt of each carboxylic acid mentioned above, and examples of alkaline-earth metal carboxylate are magnesium salt of ach carboxylic acid mentioned above. At this time, one kind alone, or two and more kinds of the carboxylic acids or carboxylates are mixed to be used.

The total concentration of carboxylic acid and carboxylate in the electrolyte is preferable to be 10 ppm (mass fraction) and more. The reason is that if it is lower than the value, monomers are not sufficiently polymerized. Also, the concentration is preferable to be 10% (mass fraction) and below. The reason is that if it is too high, the battery characteristic is deteriorated.

Each of the positive electrode lead 11 and the negative electrode lead 12 is lead out from the inside of the exterior member 30 towards outside, for example, in the same direction. Part of the positive electrode lead 11 is connected to the positive electrode collector layer 21b inside the exterior member 30. Also, part of the negative electrode lead 12 is connected to the negative electrode collector layer 22b inside the exterior member 30. Each of the positive electrode lead 11 and the negative electrode lead 12 is made of a metallic material such as aluminum, copper, nickel or stainless.

The exterior member 30 is formed of, for example, a laminated film in which a high polymer film, a metallic film, and a high polymer film are laminated in this order. The high polymer film is formed of, for example, polyolefin resin such as polypropylene or polyethylene. The metallic film is formed of, for example, an aluminum film.

The exterior member 30 and the positive electrode lead 11 and the negative electrode lead 12 are tightly attached with, for example, a sealing film 31 being interposed therebetween thereby sufficiently preventing the incoming air. The sealing film 31 is made of a substance stickable to the positive electrode lead 11 and the negative electrode lead 12. For example, in the case where the positive electrode lead 11 and the negative electrode lead 12 are formed of the above-mentioned metallic material, the sealing film 31 is preferable to be made of polyolefin resin such as polyethylene, polypropylene, denatured polyethylene, or denatured polypropylene.

Next, a method of producing the battery will be described.

First, a positive electrode mixture is prepared by mixing the positive electrode material, a conductive agent and a binder. The positive electrode mixture is dispersed in a solvent such as N-methyl-pirrolidone thereby to obtain a positive electrode mixture slurry. The positive electrode mixture slurry is applied on the positive electrode collector layer 21b and then the solvent is dried. A positive electrode mixture layer 21a is formed by performing compression-mold thereon. Thereby, a positive electrode 21 is produced. Then, the positive electrode lead 11 is fixed to the positive electrode collector layer 21b by welding or the like.

Next, a negative electrode mixture is prepared by mixing, for example, the negative electrode material capable of occluding/releasing lithium and a binder. The negative electrode mixture is dispersed in a solvent such as N-methyl-pirrolidone thereby to obtain a negative electrode mixture slurry. The negative electrode mixture slurry is applied on the negative electrode collector layer 22b and then the solvent is dried. A negative electrode mixture layer is formed by performing compression-mold thereon. Thereby, a negative electrode 22 is produced. Then, the negative electrode lead 12 is fixed to the negative electrode collector layer 22b by welding or the like.

Then, a separator 23 is provided. The positive electrode 21 and the negative electrode 22 are laminated with the positive electrode mixture layer 21a and the negative electrode mixture layer 22a opposing each other, with the separator 23 being interposed therebetween.

Then, for example, monomers capable of being radical-polymerized, lithium salt, a plasticizer, at least either carboxylic acid or carboxylate, and if necessary a radical-polymerization starting agent are mixed. Then, the separator 23 is impregnated with the obtained mixed-solvent. At this time, it is preferable that the positive electrode mixture layer 21a and the negative electrode mixture layer 22a be impregnated with the mixed-solvent. Examples of the radical-polymerization starting agent are diacylperoxide, peroxycarbonate, peroxyester, peroxyketal, dialkylperoxide, hydroperoxide, and azo compound. One of these alone, or two and more kinds may be mixed to be used.

After impregnating the separator 23 with the mixed solvent, for example, an exterior member 30 is prepared and the battery device 20 is inserted inside the exterior member 30. The exterior member 30 is adsorbed to the battery device 20 in a decompression atmosphere while sealing the outer frame of the exterior member 30 by thermal fusion. In the end portion of the exterior member 30 from which the positive electrode lead 11 and the negative electrode lead 12 are lead out, a sealing film 31 is placed, respectively, so that the positive electrode lead 11 and the negative electrode lead 12 lies therebetween. Then, the outer frames are attached to each other with the sealing film 31 being interposed therebetween.

After sealing the outer frames of the exterior member 30, the mixed solvent is solidated (here, gelation) by applying a heat treatment at a predetermined temperature at, for example, 95° C. and below, so as to perform, for example, radical-polymerization of monomers thereby obtaining the electrolyte. Thereby, a battery shown in FIG. 1 and FIG. 2 is completed. At this time, at least either carboxylic acid or carboxylate is contained in the mixed solvent so that, even if the negative electrode collector layer 22b contains copper, polymerization of monomers is smoothly processed and the remaining ratio of non-reacted monomers becomes very small. Also, monomers are polymerized after composing the battery so that part of the electrolyte enters into the positive electrode mixture layer 21a and the negative electrode mixture layer 22a. As a result, the positive electrode 21, the negative electrode 22, and the electrolyte are tightly attached. In addition, polymerization is sufficiently processed even if the polymerization temperature is as low as 95° C. and below, so that decomposition of the electrolyte is suppressed.

The battery acts as follows.

When the battery is charged, for example, lithium is released from the positive electrode 21 and is occluded to the negative electrode 22 through the electrolyte. When the battery is discharged, for example, lithium is released from the negative electrode 22 and is occluded to the positive electrode 21 through the electrolyte. At this time, at least either carboxylic acid or carboxylate is contained in the electrolyte. Therefore, monomers are sufficiently polymerized to be a high polymer and the amount of non-reacted monomers remained in the electrolyte becomes extremely small. As a result, decomposition and reaction of monomers are suppressed even after repeating charging/discharging, so that the deterioration in the charging/discharging efficiency and the charging/discharging characteristic can be prevented.

In the embodiment of the invention, the battery comprises the electrolyte containing at least either carboxylic acid or carboxylate. Therefore, in the case where the electrolyte contains a high polymer obtained by polymerizing monomers, polymerization of monomers can be smoothly processed even if there is a factor for inhibiting reaction such as copper. As a result, the amount of non-reacted monomers remained in the electrolyte can be suppressed to be extremely small. Therefore, deterioration in the battery characteristic such as the charging/discharging efficiency and the charging/discharging characteristic can be prevented even if the negative electrode collector layer 22b is formed of copper.

Also, polymerization of monomers can be smoothly processed even under the existence of copper, so that the monomers can be polymerized even in a state adjacent to the electrodes. As a result, the positive electrode 21, the negative electrode 22, and the electrolyte can be tightly attached.

Second Embodiment

Figure 3:
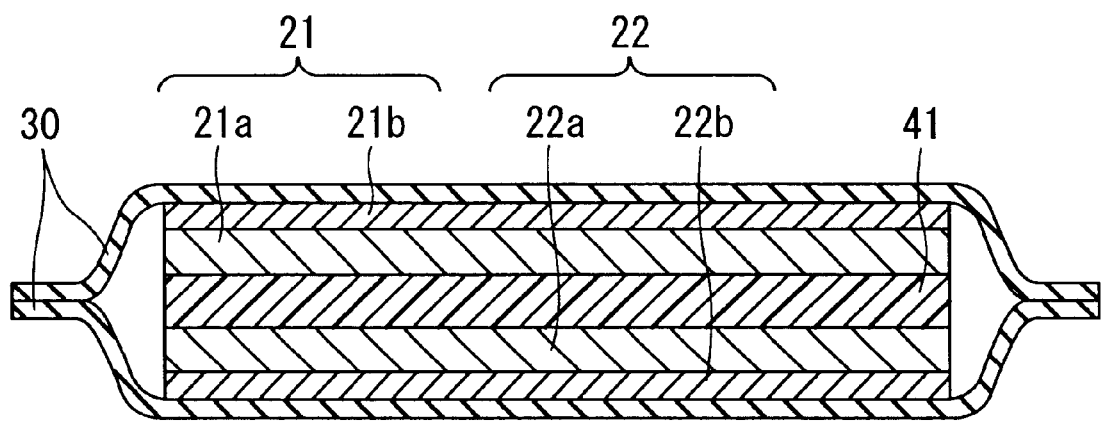
FIG. 3 is a cross section showing the configuration of a battery according to a second embodiment of the invention.

FIG. 3 shows the cross sectional structure of a battery according to a second embodiment of the invention. FIG. 3 corresponds to the cross sectional structure taken along the line A—A in FIG. 1. The battery has the same configuration, action and effects as those of the first embodiment except that the battery comprises an electrolyte 41 instead of the electrolyte of the battery according to the first embodiment, and that the battery does not comprise a separator. Therefore, the same numerals and codes are used to the same structural elements and the detailed description will be omitted.

An electrolyte 41 is so-called a high polymer solid electrolyte, and contains, for example, at least either carboxylic acid or carboxylate, a high polymer, and lithium salt as an electrolyte salt. In other words, except for not containing the plasticizer, it is the same as the electrolyte according to the first embodiment. As the high polymer, the ones having ionic conductivity can be used out of the ones described in the first embodiment.

The battery according to the embodiment of the invention can be produced in the same manner as in the first embodiment except for the followings: at least either carboxylic acid or carboxylate, the monomers capable of being radical-polymerized, lithium salt and a plasticizer are mixed, and the obtained mixed-solvent is applied onto the positive electrode mixture layer and the negative electrode mixture layer, respectively; and the positive electrode and the negative electrode are laminated so that each electrolyte directly opposes each other. Also, the battery can be produced by preparing an electrolyte containing a plasticizer in the same manner as in the first embodiment, and then by removing the plasticizer by, for example, drying.

EXAMPLES

Specific Examples of the invention will be described in detail by referring to FIG. 1 and FIG. 2.

Examples 1 to 18

First, 1 mol of cobalt carbonate ($CoCO_3$) was mixed with 0.5 mol of lithium carbonate ($Li_2CO_3$), and the mixture was calcined for five hours in the air at 900° C. thereby obtaining $LiCoO_2$. Then, a positive electrode mixture was prepared by mixing 85 parts by volume of $LiCoO_2$ as the positive electrode material, 5 parts by volume of graphite as a conductive agent, and 10 parts by volume of polyvinylidene fluoride as a binder. The positive electrode mixture was then dispersed in a solvent such as N-methyl-2-pirrolidone thereby to obtain a positive electrode mixture slurry. The positive electrode mixture slurry was applied homogeneously on the positive electrode collector layer 21b made of a band-shaped aluminum foil of 20 μm thick, and then the solvent was dried. A positive electrode mixture layer 21a was formed by compression-mold using a roller presser or the like. Thereby, a positive electrode 21 was produced.

Also, a negative electrode mixture was prepared by mixing 90 parts by volume of pulverized graphite powder as the negative electrode material and 10 parts by volume of polyvinylidene fluoride as a binder. The negative electrode mixture was then dispersed in a solvent such as N-methyl-2-pirrolidone thereby to obtain a negative electrode mixture slurry. The negative electrode mixture slurry was applied homogeneously on one side of the negative electrode collector layer 22b made of a band-shaped copper foil of 15 μm thick, and then the solvent was dried. A negative electrode mixture layer 22a was formed by compression-mold using a roller presser or the like. Thereby, a negative electrode 22 was produced.

After producing the positive electrode 21 and the negative electrode 22, the positive electrode lead 11 was attached to the positive electrode collector layer 21b while the negative electrode lead 12 was attached to the negative electrode collector layer 22b. Then, a separator 23 made of a microporous polypropylene film of 25 μm thick was prepared, and the positive electrode 21 and the negative electrode 22 were stuck together with the separator 23 being interposed therebetween.

Then, monomers capable of radical-polymerization such as methoxydiethyleneglycholmethacrylate and polyethyleneglycholmethacrylate, and plasticizers such as propylene carbonate, ethylene carbonate, and diethyl carbonate were mixed in the following mass fraction; methoxydiethyleneglycholmethacrylate:polyethyleneglycholmethacrylate: propylene carbonate:ethylene carbonate:diethyl carbonate are= 5:5:20:20:50. Then, a mixed solvent was prepared by dissolving carboxylic acid or carboxylate, lithium phosphate hexafluoride ($LiPF_6$) as an electrolyte salt, and bis (4-t-butylcyclohexyl) peroxydicarbonate (BCHPC) as a radical-polymerization starting agent, in the mixed solvent. At this time, the kinds of carboxylic acid or carboxylate used in Example 1 to 18 were varied as shown in Table 1. The concentration of carboxylic acid or carboxylate mixed in the electrolyte was 10 ppm by mass fraction. Also, $LiPF_6$ was mixed so that the concentration in the plasticizer was 1 $mol/dm^3$, and 15 mol of BCHPC was mixed with 1 mol of monomers capable of radical-polymerization.

TABLE 1

| | Kinds of Carboxylic Acid or Carboxylate | Remaining Ratio of Monomers | Initial Discharging Capacity (mAh) | Charging/ Discharging Efficiency (%) | Capacity Retention Rate (%) |
|---|---|---|---|---|---|
| Example 1 | Formic Acid | <0.01 | 498 | 93 | 80 |
| Example 2 | Acetic Acid | <0.01 | 497 | 93 | 79 |
| Example 3 | Butyric Acid | <0.01 | 497 | 95 | 82 |
| Example 4 | Hexanoic Acid | <0.01 | 495 | 95 | 78 |
| Example 5 | Octanic Acid | <0.01 | 495 | 94 | 79 |
| Example 6 | Decanoic Acid | <0.01 | 495 | 93 | 81 |
| Example 7 | Lauric Acid | <0.01 | 493 | 93 | 80 |
| Example 8 | Myristic Acid | <0.01 | 497 | 92 | 83 |
| Example 9 | Palmitic Acid | <0.01 | 495 | 94 | 79 |
| Example 10 | Stearic Acid | <0.01 | 493 | 93 | 78 |
| Example 11 | Oxalic Acid | <0.01 | 496 | 94 | 81 |
| Example 12 | Malonic Acid | <0.01 | 494 | 92 | 80 |
| Example 13 | Adipic Acid | <0.01 | 493 | 92 | 78 |
| Example 14 | Benzoic Acid | <0.01 | 495 | 93 | 79 |
| Example 15 | Terephtalic Acid | <0.01 | 495 | 92 | 78 |
| Example 16 | Perfluoro n-octanoic acid | <0.01 | 496 | 93 | 79 |
| Example 17 | Lithium Stearate | <0.01 | 497 | 95 | 80 |
| Example 18 | Magnesium Stearate | <0.01 | 498 | 95 | 82 |

After preparing the mixed solvent, the separator 23 and the neighboring regions were impregnated with the mixed solvent, and the exterior member 30 was attached to the positive electrode 21 and the negative electrode 22 with a sealing agent 40 applied therebetween in a decompression atmosphere. Then, a sealing film 31 was provided between the positive electrode 11, the negative electrode 12 and the exterior member 30, and the outer frames of the exterior member 30 were sealed by thermal fusion. Then, monomers contained in the mixed solvent was radical-polymerized by heating for 45 minutes at 75° C. to obtain an electrolyte. Thereby, the battery shown in FIG. 1 was produced.

As Comparative Example 1 for Examples 1 to 18, a battery was produced in the same manners as in Examples 1 to 18 except that carboxylic acid or carboxylate was not added to the mixed solvent to be the electrolyte. Also, as Comparative Examples 2 and 3 for Examples 1 to 18, batteries were produced in the same manner as in Examples 1 to 18 except that the compounds shown in Table 2 were dissolved in the mixed solvent to be the electrolyte, respectively, instead of carboxylic acid or carboxylate.

TABLE 2

| | Kinds of Carboxylic Acid or Carboxylate | Remaining Ratio of Monomers | Initial Discharging Capacity (mAh) | Charging/ Discharging Efficiency (%) | Capacity Retention Rate (%) |
|---|---|---|---|---|---|
| Comparative Example 1 | | 0.42 | 287 | 44 | <1 |
| Comparative Example 2 | Dodecylbenzen Sulfonate | 0.44 | 251 | 48 | <1 |
| Comparative Example 3 | Methylester Octanoate | 0.46 | 262 | 50 | <1 |

The electrolytes were taken out from the inside of the batteries produced in such manners in Examples 1 to 18 and Comparative Examples 1 to 3, and infrared spectroscopic analysis was performed thereon to obtain the concentration of monomers remained in the electrolyte on the basis of spectral intensity of 1636 $cm^{-1}$ indicating the existence of double-bonding of monomers. The results obtained are shown in Table 1 and Table 2. In Table 1 and Table 2, the values of remaining ratio of monomers indicate the ratio after polymerization, provided the concentration of monomers before polymerization is 1.

As can be seen from Table 1 and Table 2, the remaining ratio of monomers in Examples 1 to 18 were lower than 0.01 and, on the contrary, the remaining ratio of monomers in Comparative Examples 1 to 3 were as high as 0.42 and more. In other words, it has been learned that the content of monomers in the electrolyte containing carboxylic acid or carboxylate was extremely small.

Also, charging/discharging were performed on the batteries produced in Examples 1 to 18 and Comparative Examples 1 to 3, thereby to obtain the discharging capacity (initial discharging capacity) and the charging/discharging efficiency which is the proportion of the discharging capacity against the charging capacity. At this time, charging was performed at a constant current of 150 mA until the battery voltage reached 4.2 V, then continued for a total of 15 hours at a constant voltage of 4.2 V. Discharging was performed at a constant current of 100 mA until the battery voltage reached 2.5 V. Both were performed at 23° C. The results are shown in Table 1 and Table 2.

As can be seen from Table 1 to Table 2, the initial discharging capacity in Examples 1 to 18 were as large as 493 mAh and more, and the initial discharging capacity in Comparative Examples 1 to 3 were as low as 287 mAh and below, respectively. Also, the charging/discharging efficiency in Examples 1 to 18 were as high as 92% and more, and the charging/discharging capacity in Comparative Examples 1 to 3 were as low as 50% and below, respectively. In other words, it has been learned that a large initial discharging capacity and a high charging/discharging efficiency can be obtained by containing carboxylic acid or carboxylate in the electrolyte.

Furthermore, 500 cycles of charging/discharging were performed on the batteries of Examples 1 to 18 and Comparative Examples 1 to 3 under the same condition as described above. Then, the proportion of the $500^{th}$ cycle of the discharging capacity against the $1^{st}$ cycle of the discharging capacity, that is, the capacity retention rate at $500^{th}$ cycle, was obtained. The results are shown in Table 1 and Table 2.

As can be seen from Table 1 and Table 2, the capacity retention rate at $500^{th}$ cycle in Examples 1 to 18 were as high as 78% and more and, on the contrary, the capacity retention rate at $500^{th}$ cycle in Comparative Examples 1 to 3 were as low as 1% and below, respectively. In other words, it has been learned that an excellent charging/discharging cycle characteristic can be obtained by containing carboxylic acid or carboxylate in the electrolyte.

Although not specifically described at this time, the same results can be obtained when using methoxydiethylenegly-cholmethacrylate or polyethyleneglycholdimethacrylate alone as monomers. Also, the same results can be obtained when using monomers other than methoxydiethylenegly-cholmethacrylate and polyethyleneglycholdimethacrylateacrylate.

The invention has been described by referring to the embodiments and Examples. However, the invention is not limited to the embodiments and Examples but various modifications are possible. For example, the above-mentioned first embodiment and Examples have been described by referring to a battery comprising the separator 23. However, it may not comprise the separator 23. Also, the second embodiment has been described by referring to a battery which does not comprise a separator. However, a separator may be interposed between the positive electrode 21 and the negative electrode 22.

Furthermore, in the above-mentioned embodiment and Examples, the tabular battery device 20 has been described. However, the battery device 20 may be folded inside the exterior member 30 or may be rolled around it.

In addition, in the above-mentioned embodiment and Examples, an electrolyte containing lithium salt as the electrolyte salt has been specifically described. However, the invention is also applicable to an electrolyte containing other electrolyte salt such as sodium (Na) salt or calcium (Ca) salt.

Also, in the above-mentioned embodiment and Examples, a type of battery in which the battery device 20 is enclosed inside of the exterior member 30 made of laminated film has been described. However, the invention is also applicable to coin-type or button-type batteries.

In addition, in the above-mentioned embodiments and Examples, a secondary battery has been described. However, the electrolyte of the invention is also applicable to other batteries such as primary batteries. Furthermore, the electrolyte can be used for other electric devices such as condensers, capacitors, or electrochromic devices.

As described, the electrolyte of the invention contains at least either carboxylic acid or carboxylate. Therefore, polymerization of monomers can be smoothly processed even under the existence of copper in the case where the electrolyte contains the high polymer obtained by, for example, polymerization of monomers, and the amount of non-reacted monomers remained in the electrolyte can be suppressed to be extremely small. As a result, an excellent quality of electrolyte with little amount of remained monomers can be obtained.

Also, in the battery of the invention, deterioration in the battery characteristic can be prevented since the battery is produced to comprise the electrolyte of the invention.

Obviously many modifications and variations of the present invention are possible in the light of above teachings. It is therefore to be understood that within the scope of the appended claims the invention may be practiced otherwise than as specifically described.

What is claimed is:

1. A solid or gel electrolyte prepared by polymerization reaction containing at least one of carboxylic acid, alkali metal carboxylate, and alkaline-earth metal carboxylate, wherein the carboxylic acid is fluoroalkylcarboxylic acid.

2. A solid or gel electrolyte as claimed in claim 1, wherein the fluoroalkylcarboxylic acid is perfluoro n-caprylate.

3. A solid or gel electrolyte prepared by polymerization reaction containing at least one of carboxylic acid, alkali metal carboxylate, and alkaline-earth metal carboxylate, wherein the alkali metal carboxylate is lithium alkylcarboxylate fluoride.

4. A solid or gel electrolyte as claimed in claim 3, wherein the lithium alkylcarboxylate fluoride is lithium perfluoro n-caprylate.

5. A solid or gel electrolyte prepared by polymerization reaction containing at least one of carboxylic acid, alkali metal carboxylate, and alkaline-earth metal carboxylate, wherein the alkaline-earth metal carboxylate is one of magnesium formate, magnesium acetate, magnesium octanoate, and magnesium stearate.

6. A solid or gel electrolyte prepared by polymerization reaction containing at least one of carboxylic acid, alkali metal carboxylate, and alkaline-earth metal carboxylate, wherein the alkaline-earth metal carboxylate is magnesium alkyldicarboxylate.

7. A solid or gel electrolyte as claimed in claim 6, wherein the magnesium alkyldicarboxylate is one of magnesium oxalate, magnesium malonate and magnesium adipate.

8. A solid or gel electrolyte prepared by polymerization reaction containing at least one of carboxylic acid, alkali metal carboxylate, and alkaline-earth metal carboxylate, wherein the alkaline-earth metal carboxylate is one of magnesium benzonete and magnesium terephthalate.

9. A solid or gel electrolyte prepared by polymerization reaction containing at least of carboxylic acid, alkali metal carboxylate, and alkaline-earth metal carboxylate, wherein the alkaline-earth metal carboxylate is magnesium alkylcarboxylate fluoride.

10. A solid or gel electrolyte as claimed in claim 9, wherein the magnesium alkylcarboxylate fluoride is magnesium perfluoro n-caprylate.

11. A battery comprising a positive electrode, a negative electrode, and an electrolyte, wherein the electrolyte contains at least one and more of the electrolytes as claimed in any one of claims 1, 2, 3, 4, 5, 6, 7, 8, 9, or 10.

12. A battery as claimed in claim 11, wherein the negative electrode contains copper.

13. A battery as claimed in claim 11, wherein the negative electrode contains a material capable of occluding and releasing lithium.

14. A battery as claimed in claim 11, wherein the negative electrode contains a carbonaceous material as a material capable of occluding and releasing lithium.

15. A battery as claimed in claim 11, wherein the positive electrode contains a lithium composite oxide.

16. A battery comprising a positive electrode, a negative electrode, and an electrolyte, wherein the electrolyte is prepared by polymerization reaction containing at least one of carboxylic acid, alkali metal carboxylate, and alkaline-earth metal carboxylate, and wherein the negative electrode contains copper.

17. A battery comprising a positive electrode, a negative electrode, and an electrolyte, wherein the electrolyte is prepared by polymerization reaction containing at least one of carboxylic acid, alkali metal carboxylate, and alkaline-earth metal carboxylate, and wherein the negative electrode contains a material capable of occluding and releasing lithium.

18. A battery comprising a positive electrode, a negative electrode, and an electrolyte, wherein the electrolyte is prepared by polymerization reaction containing at least one of carboxylic acid, alkali metal carboxylate, and alkaline-earth metal carboxylate, and wherein the negative electrode contains a carbonaceous material as a material capable of occluding and releasing lithium.

* * * * *